(12) United States Patent
Takahashi et al.

(10) Patent No.: US 6,211,540 B1
(45) Date of Patent: Apr. 3, 2001

(54) SEMICONDUCTOR STRAIN SENSOR AND SCANNING PROBE MICROSCOPE USING THE SEMICONDUCTOR STRAIN SENSOR

(75) Inventors: Hiroshi Takahashi; Nobuhiro Shimizu; Yoshiharu Shirakawabe; Susumu Ichihara, all of Chiba (JP); Michel Despont, Ruschlikon (CH)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/173,035

(22) Filed: Oct. 15, 1998

(30) Foreign Application Priority Data

Oct. 16, 1997 (JP) .................................................. 9-284116
Oct. 2, 1998 (JP) ................................................. 10-280910

(51) Int. Cl.[7] ................................................. H01L 29/82
(52) U.S. Cl. ........................ 257/252; 257/254; 257/417; 257/418; 257/420; 438/50; 438/52
(58) Field of Search ................................ 257/252, 254, 257/417, 418, 420; 438/50, 52

(56) References Cited

U.S. PATENT DOCUMENTS 5,279,162 * 1/1994 Takebe et al. ........................ 73/726
5,632,841 * 5/1997 Hellbaum et al. .................... 156/245
5,713,667 * 2/1998 Alvis et al. ........................... 374/178
5,838,005 * 11/1998 Majumdar et al. ................... 250/306

FOREIGN PATENT DOCUMENTS

| 695927A2 | * | 2/1996 | (EP) . |
| 695927A3 | * | 2/1996 | (EP) . |
| 802394A1 | * | 10/1997 | (EP) . |
| WO9212398 | * | 7/1992 | (WO) . |
| WO9429894 | * | 12/1994 | (WO) . |
| WO9709584 | * | 3/1997 | (WO) . |
| WO9724915 | * | 7/1997 | (WO) . |

* cited by examiner

Primary Examiner—William Mintel
(74) Attorney, Agent, or Firm—Adams & Wilks

(57) ABSTRACT

A semiconductor strain sensor comprises a semiconductor cantilever probe having a free end and a surface portion for undergoing deformation due to a displacement of the free end. A Schottky junction is disposed on the surface portion of the semiconductor cantilever probe and is positioned to undergo a change in electrical characteristic in response to the deformation of the surface portion. The amount of displacement of the free end of the cantilever probe is detected on the basis of a change in the electrical characteristic of the Schottky junction.

27 Claims, 16 Drawing Sheets

SEMICONDUCTOR STRAIN SENSOR AND SCANNING PROBE MICROSCOPE USING THE SEMICONDUCTOR STRAIN SENSOR

BACKGROUND OF THE INVENTION

The present invention relates to a semiconductor strain sensor, a method of processing the sensor, and a scanning probe microscope, particularly forming a Schottky-barrier by contacting metal to a beam portion of a probe made of a semiconductor substrate, detecting deflection of the probe as change of characteristic of the Schottky-barrier.

In the conventional scanning probe microscope (SPM), an exploring needle is attached at a free end of a probe, and deflection of the probe generated by movement up and down of the exploring needle response to raggedness of surface of a sample has been detected using optical interferometry of an optical polarization technique. However, there has been a problem that conventional microscope needs complex adjustment when using such an optical detecting method. On the other hand, recently a small-size, light-weight semiconductor strain sensor is widely used, which can output a deflection as an electric signal directly. The sensor is adopted for the probe of the SPM.

As shown in FIG. 20, for example, a probe-type semiconductor strain sensor comprises a cantilever arm portion (beam portion) 1 having a free end 1a formed by selectively etching a part of a semiconductor substrate 2 so as to have a U-shape and a gage portion 3 formed near a fixed end (root) of the cantilever arm portion 1, and the gage portion 3 detects stress/strain at a portion of the cantilever in response to deflection of the free end 1a, and the strain is converted to an electric signal and outputted.

In the conventional semiconductor strain sensor, as described in Japanese Opened Patent No. 5-196458 for example, the gage portion is constructed with piezo resistance. As the electric resistance of the piezo resistance varies by applying stress, deflection is detected by measuring a resistance change of the piezo resistance at the resistance bridge circuit, such as Wheatstone bridge or the like.

As above-mentioned, when deflection of the probe is detected as stress/strain applied to piezo resistance, as the resistance rate of change for strain of the piezo resistance, namely voltage or current rate of change, is little and sensitivity is low, not only is a complex bridge circuit needed for the detecting, but an extremely accurate adjustment of each resistance constructing the resistance bridge is also needed.

An object of the present invention is to provide a semiconductor strain sensor solving the conventional above-mentioned problem by outputting deflection of the probe with high response speed as a large signal change, a method of processing the sensor, and a scanning probe microscope adopting the semiconductor strain sensor for the probe.

SUMMARY OF THE INVENTION

To solve the above-mentioned problem, the present invention is characterized by the following means:

(1) A semiconductor strain sensor of the present invention comprises a probe having a semiconductor probe supported like a cantilever, a first metal electrode having a Schottky junction on at least a surface of a beam portion of a semiconductor probe, a high concentration contact domain formed at surface of said semiconductor probe, and a second metal electrode connected to the high concentration contact domain.

(2) A method of processing a semiconductor strain sensor of the present invention comprises forming a semiconductor probe by etching a semiconductor substrate, forming a high concentration contact domain selectively at a surface of said semiconductor probe, selectively Schottky-joining the first metal electrode at a surface of a beam portion of said semiconductor probe, and contacting a second metal electrode to said high concentration contact domain.

(3) In the semiconductor strain sensor of the present invention, a thin film is formed on at least one of main surfaces of said semiconductor probe so that stress strain always appears on at least the Schottky junction.

(4) A scanning probe microscope of the present invention uses a semiconductor strain sensor where a Schottky junction domain is formed at a surface of a beam portion as a scanning probe.

According to the above-mentioned configuration (1), as stress/strain appears at a Schottky junction and the electric characteristic (diode characteristic) of the Schottky junction is sharply changed when the free end of the probe bends, deflection of the free end can be measured by detecting with a proper detecting circuit.

According to the above-mentioned configuration (2), a cantilever-type semiconductor stress/strain sensor having a Schottky junction can be produced easily.

According to the above-mentioned configuration (3), as stress/strain always appears without relation with displacement of the free end at Schottky junction and larger stress strain appears at the Schottky junction when the free end of the probe bends, the electric characteristic (diode characteristic) of the Schottky junction can be sharply changed. When a direction of deflection is set opposite to a direction of an exploring needle, the strain is measured with high accuracy as the angle between the surface of the sample and the exploring needle is about 90 degrees.

According to the above-mentioned configuration (4), as deflection of a probe is detected as a change of the electric characteristic of a Schottky junction, a surface shape of the sample can be observed with high sensitivity.

DETAILED DESCRIPTION OF THE PREFERRED EMBODIMENTS

Figure 1:
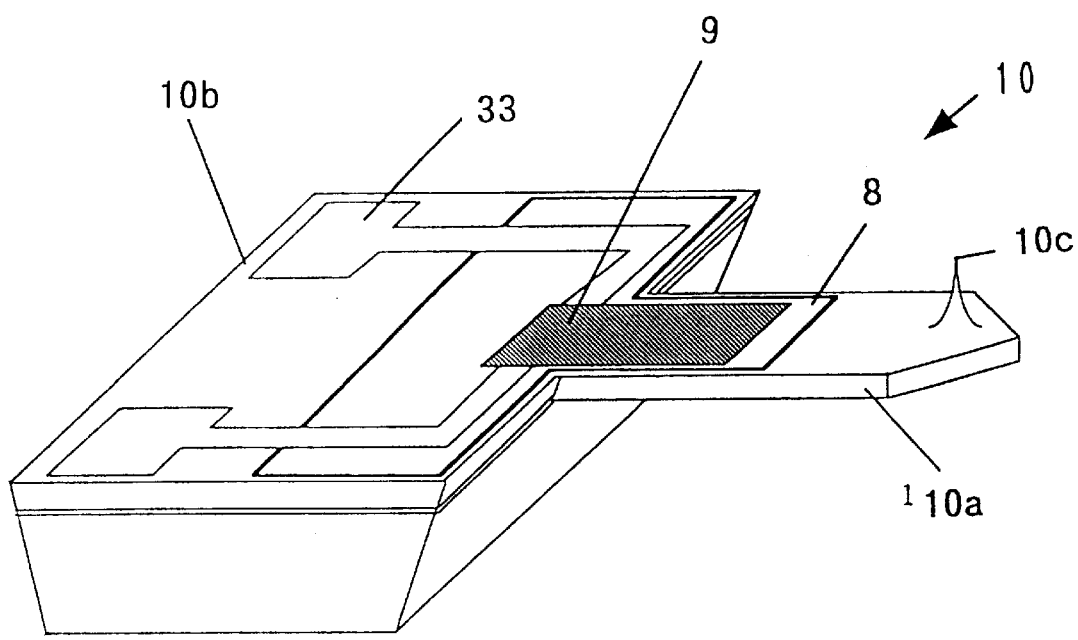
FIG. 1 is a perspective view of an outline of the present invention.

Referring to the figures, an embodiment of the present invention will be described in detail. FIG. 1 is a perspective view showing a general construction of a main part of a semiconductor probe according to the present invention. A probe 10 comprises an arm portion 10a having a free end, an exploring needle 10c at a tip of the arm portion, a supporting portion 10b holding and fixing the arm portion, a sensor portion 9, and a thin film 8 (insulation film 40) formed at a domain including at least the sensor portion 9. As bending of the arm portion 10a is concentrated on a portion of a root thereof, the sensor portion 9 is desirably formed at a domain including the border of at least the arm portion 10a and the supporting portion 10b. In the present invention, a Schottky junction is used for the sensor portion.

An electrode for detecting a signal is connected to the sensor portion with wiring 33. Low resistance metal material such as mainly Al, W, Ti, Ta, Cr, and so on are used for the wiring material. Among the materials, Al is the most general material.

The thin film 8 functions as previously, applying strain (stress) to the sensor portion 9. The case in which stress is compressive stress is desirable because the direction of the exploring needle 10c is almost vertical toward the sample so as to observe accurately during sample observation as the arm portion 10a bends to an under side of FIG. 1. Layer insulation film 30 where stress is applied can replace the insulation film 40. In this case too, the thin film 8 can be omitted. Stress can be applied to the sensor portion by using a material having stress for wiring 33 so as to replace the thin film 8. Namely, any material except the insulation film can be used if the thin film 8 applies stress to the sensor portion 9 and does not exert a bad influence such as a short-circuit to the electric characteristic of the sensor portion 9.

Although a shape of the sample can be observed at a tip part of the arm portion 10a without the exploring needle 10c in the sample observation, it is desirable that the exploring needle 10c is formed in order to obtain high accuracy and high resolution. In order to obtain high accuracy and high resolution, it is desirable that the exploring needle 10c is longer than raggedness of the observed sample and that the diameter of the tip is small. There are various kinds of shapes such as substantially rectangle-shaped as FIG. 1, U-shaped, or the like so as to design in accordance with use of characteristic in the arm portion 10a.

Figure 2A:
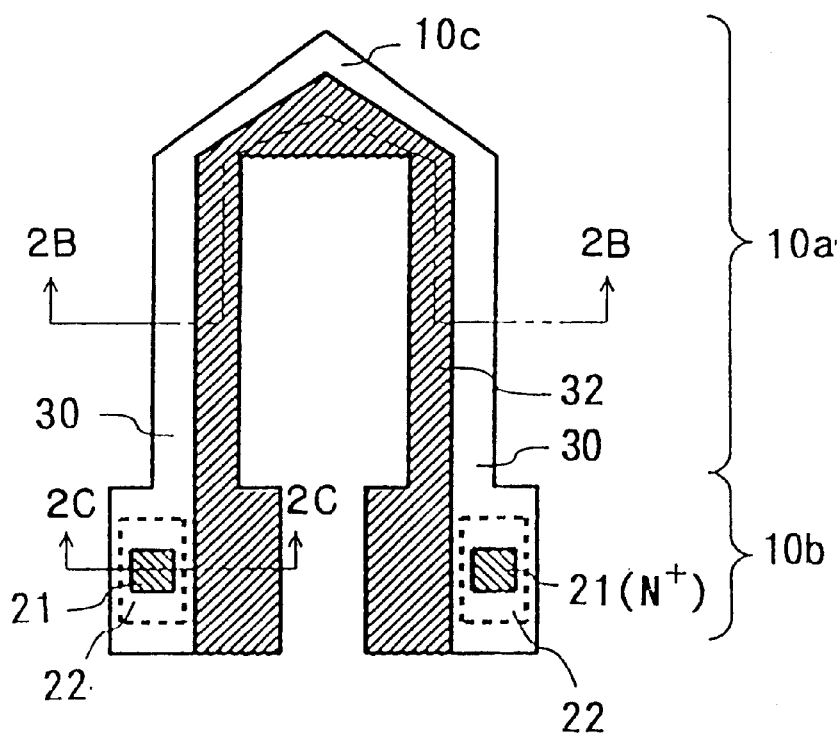
FIG. 2A is a plane view of a first embodiment of the present invention.
Figure 2B:
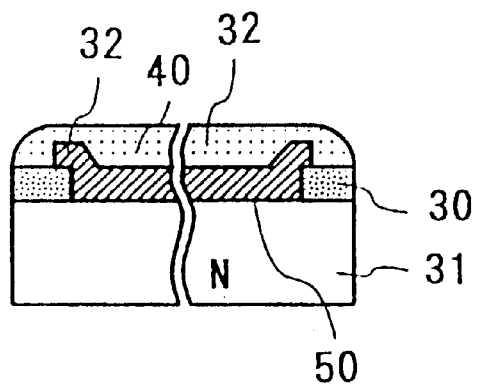
FIG. 2B is a sectional view taken by 2B—2B line of FIG. 2A.
Figure 2C:
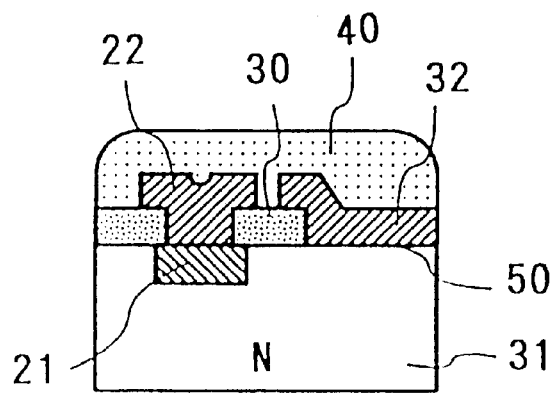
FIG. 2C is a sectional view taken by 2C—2C line of FIG. 2A.

FIG. 2A is a plane view of a probe-type semiconductor strain sensor of a first embodiment of the present invention, particularly for describing the arm portion 10b and the sensor portion 9 of FIG. 1. FIG. 2B is a cross sectional view taken by 2B—2B line of FIG. 2A. FIG. 2C is a cross sectional view taken by 2C—2C line of FIG. 2A. In FIG. 2A, the exploring needle 10c and the insulation 40 (thin film 8) described later are not shown.

The probe 10 of the present invention comprises a U-shaped cantilever arm portion 10a and a supporting portion 10b, and at a tip of the cantilever arm portion 10a, an exploring needle 10c (not shown) for SPM is formed. In the present embodiment, the probe 10 comprises an N-type substrate 31, and at a surface thereof, an electrode 32 is Schottky-joined in a generally U-shape along an inside of the arm portion 10a. At a part of the surface of the substrate 31 which does not have the electrode, a layer insulation film 30 is formed. On the other hand, at the supporting portion 10b, an N$^+$ contact domain 21 is formed on a surface of the N-type substrate 31, at a surface thereof, electrodes 22 are ohmic-contacted. Electrodes 22 are connected to the wiring 33 of FIG. 1, supplies bias voltage (current), and detects signal. The electrode 22 can be produced with the same material as the wiring 33, and both can be formed at the same time.

An insulation film 40 such as, for example, $SiO_2$ film, $Si_3N_4$ film, or the like is layered at a surface of the N-type substrate 31 as the thin film 8 for always applying stress to a Schottky junction 50. It is desirable to form the insulation film 40 so that the stress/strain is about $1 \times 10^9$ Pa. However, the value is not determined depending on the structure of the junction portion and processing condition.

It is not required that the insulation film 40 be formed on the entire surface of the N-type substrate 31, and the film may be formed, for example, only at surface of the cantilever arm portion 10a or only at a border part between the arm portion 10a and the supporting portion 10b if stress/strain can appear at the Schottky junction 50 of the substrate 31 and the electrodes 32.

In this construction, as the cantilever arm portion 10a of the probe 10 bends at the supporting portion 10b as a fulcrum when the exploring needle 10c displaces toward a vertical direction to the plane of the paper, strain/stress appears at the Schottky junction 50 formed at the arm portion 10a, especially at a surface of the beam portion.

Figure 3A:
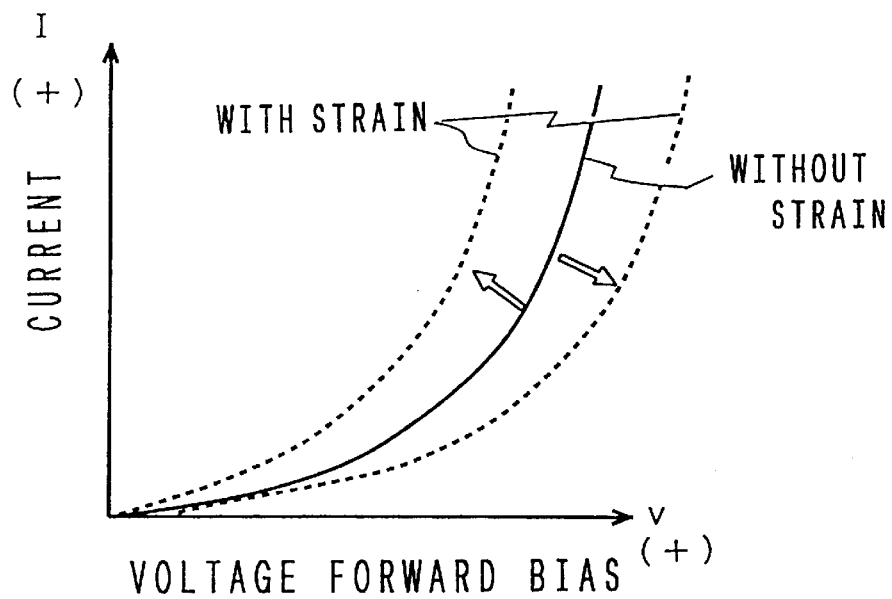
FIG. 3A is a view showing a current-voltage characteristic of forward direction of a Schottky junction according to the present invention.
Figure 3B:
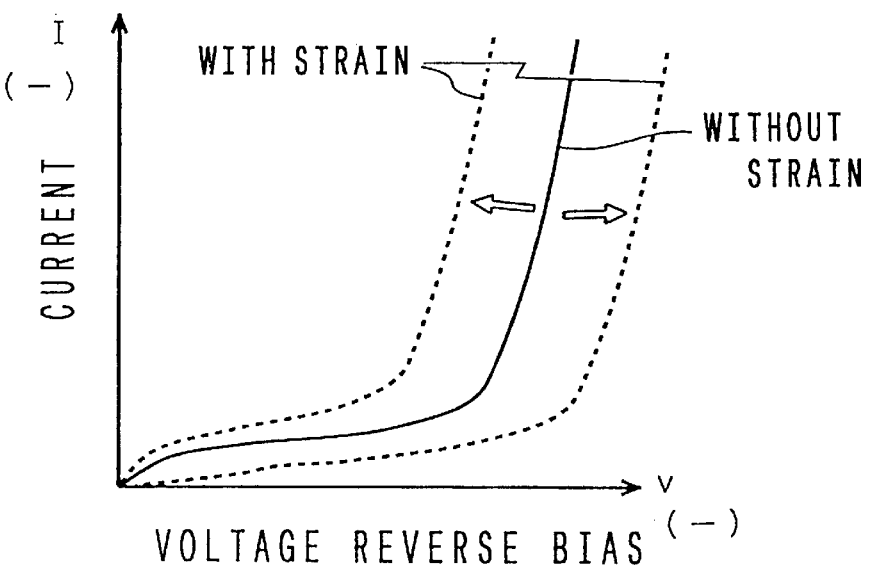
FIG. 3B is a current-voltage characteristic of reverse direction.

FIGS. 3A and 3B are views showing an example of a diode characteristic of a Schottky junction changed by stress/strain. FIG. 3A shows the characteristic at forward bias and FIG. 3B shows the one at reverse bias. It is noticed that forward direction current to forward bias changes when stress/strain appears at the Schottky junction 50 during forward bias. During reverse bias too, break voltage changes and leakage current too changes when stress/strain appears.

Figure 4:
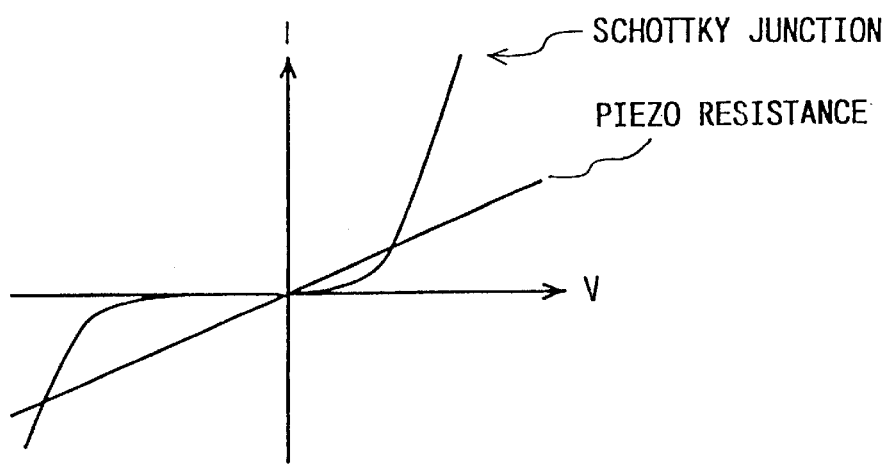
FIG. 4 is a view showing current-voltage (I-V) characteristic of a Schottky junction and a piezo resistance.
Figure 5:
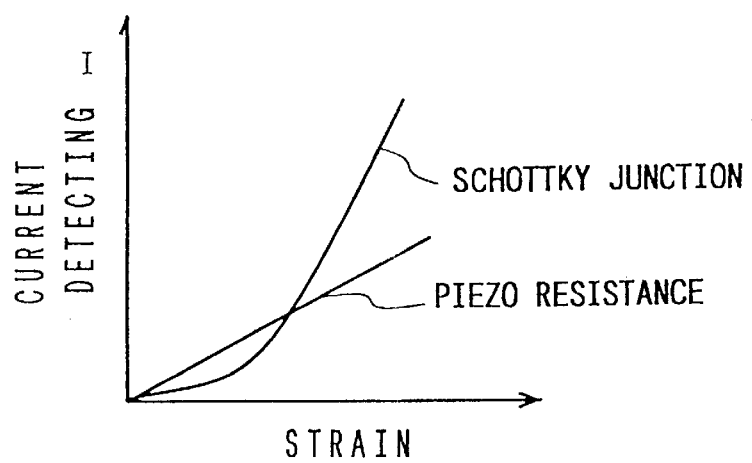
FIG. 5 is a current-strain characteristic of a Schottky junction comparing with a piezo resistance.
Figure 6:
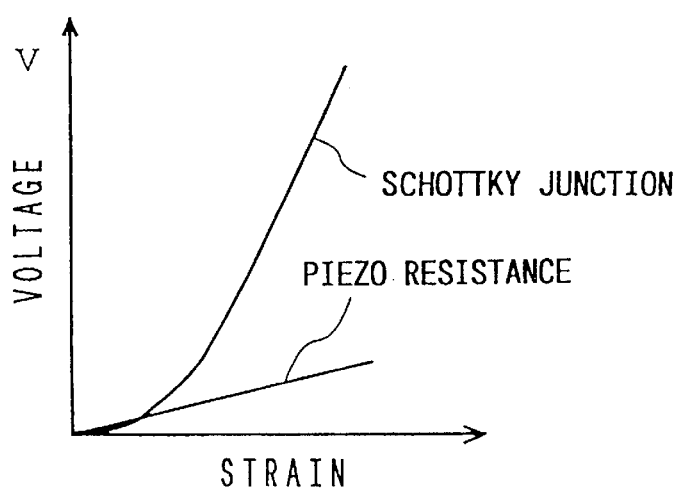
FIG. 6 is a voltage-strain characteristic of a Schottky junction comparing with a piezo resistance.

FIGS. 4 to 6 are views of current-voltage (I-V) characteristics of the Schottky junction, current I-strain characteristic, and voltage V-strain characteristic comparing with piezo resistance. Changing rate of current I and voltage V to stress are larger in the Schottky junction than in the piezo resistance at stress more than some value as shown in FIGS. 5 and 6. Therefore, by forming the Schottky junction 50 at the beam portion of the probe 10 and by detecting a change of the diode characteristic at large domain in the changing rate like the present embodiment, the detecting sensitivity of strain improves so as to correctly measure deflection of the probe 10 without using a bridge circuit such as Wheatstone bridge and the like.

The change rate of the diode characteristic to deflection of the probe is larger at larger domain in deflection, and sufficient detecting sensitivity can not be obtained when deflection is small at smaller domain in deflection. In the smaller domain in stress/strain, a signal process becomes rather complex because current I changes like secondary function to stress/strain as shown in FIG. 5.

Compared with that, stress/strain is always applied to the Schottky junction 50 by applying the insulation film 40 (the thin film 8) in the present invention. Therefore, strain appearing transiently depending on displacement during observation and stress/strain always appearing by the insulation film 40 are superimposed. Because of that, larger strain appears compared to the case in which the insulation film 40 is not formed. In the large domain in stress/strain, signal processing at actual observation becomes easy as current I changes substantially linearly to stress/strain. The above-mentioned change depends on the structure of the Schottky junction and processing condition. Therefore, the changing quantity of the characteristic is not fixed and shows similar characteristic as piezo resistance depending on a condition.

FIGS. 7A to 7F are sectional views of process steps showing a method of processing said probe-type semiconductor strain sensor of the structure described in FIG. 2A, particularly showing a sectional structure taken by 2C—2C line of FIG. 2A.

Figure 7A:
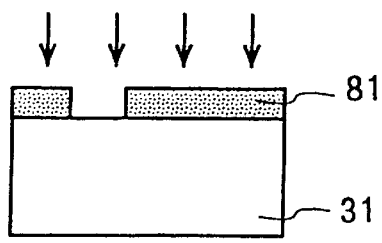
FIGS. 7A to 7F are sectional views showing a method of processing of the probe according to FIG. 2.
Figure 7B:
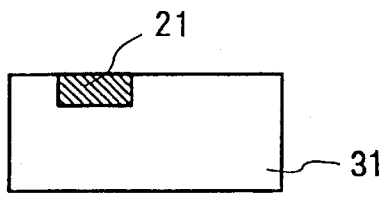

First, an N-type semiconductor substrate 31 is etched like the probe shape of FIG. 2, and at all of surface of one surface, resist 81 is applied. Next, a mask is formed removing selectively only a resist of a part equivalent to the $N^+$ contact domain 21 of FIG. 2 by the well-known photo resist technique (FIG. 7A). Next, N-type impurity (for example, phosphorus) is ion-implanted so as to form an $N^+$ contact domain 21 at a surface of the substrate 31 (FIG. 7B.)

Figure 7C:
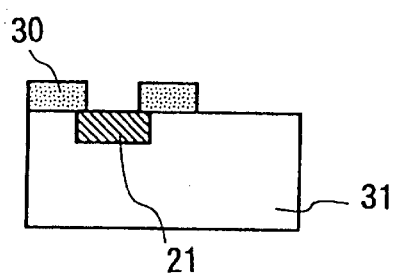

Next, $SiO_2$ film is formed at the surface of substrate for insulation film 30, and the part equivalent to the $N^+$ contact domain 21 and the part equivalent to the Schottky junction 50 of FIG. 2 are opened so as to expose the $N^+$ contact domain 21 and the Schottky junction domain (FIG. 7C.)

Figure 7D:
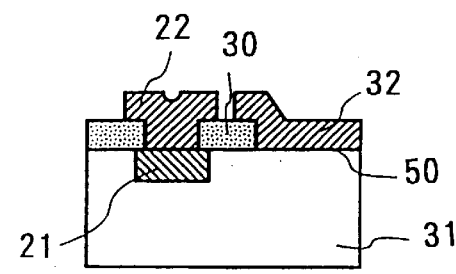

Next, the Schottky junction 50 is formed by ohmic contacting an electrode 22 to the $N^+$ contact domain 21 and by Schottky-joining an electrode 32 to the Schottky junction domain (FIG. 7D.)

Figure 7E:
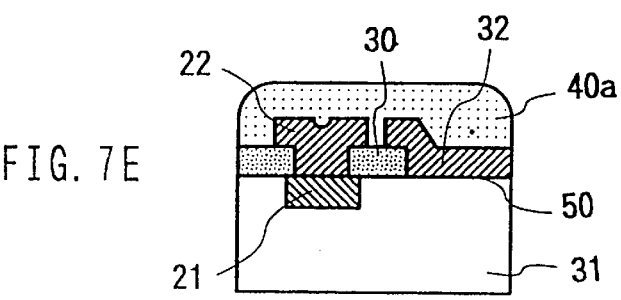
Figure 7F:
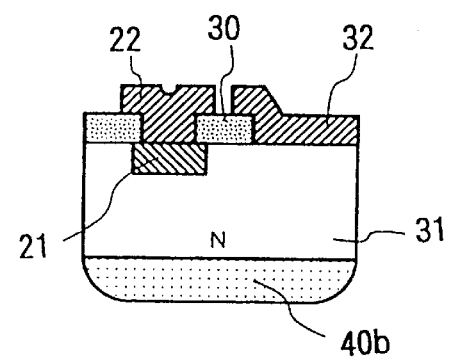

Next, an insulation film 40a is formed to always subject the Schottky junction 50 to stress/strain (FIG. 7E.). Although the insulation film 40 (40a) is formed in the present invention, the insulation film 40 (40b) may be formed at the back of the substrate (FIG. 7F.)

Figure 8A:
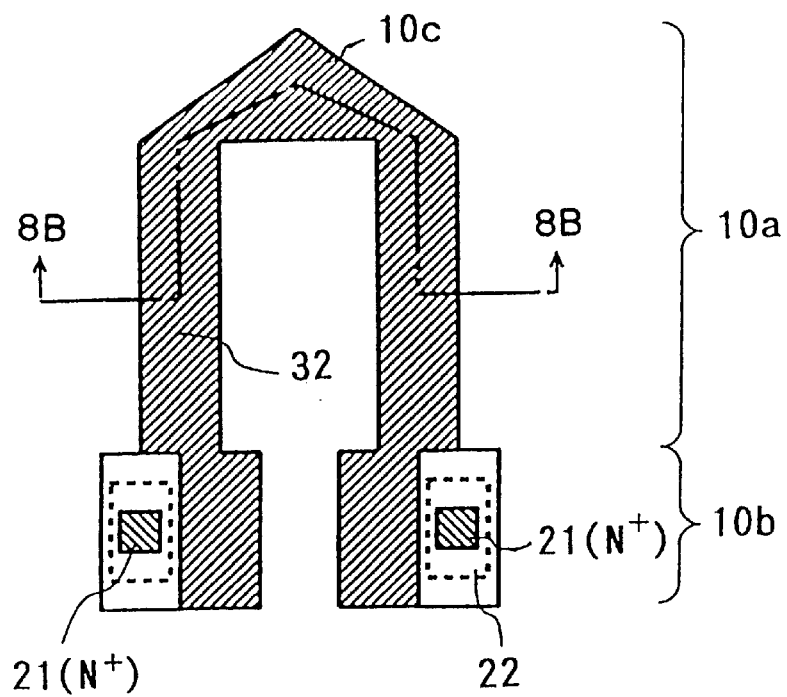
FIG. 8A is a plane view of a second embodiment of the present invention.
Figure 8B:
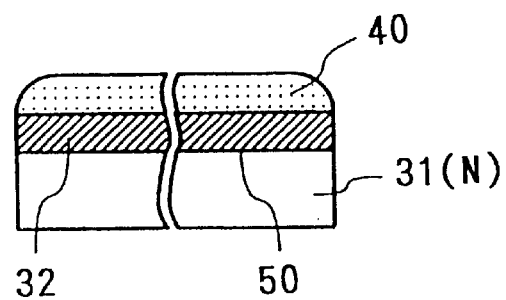
FIG. 8B is a sectional view taken by 8B—8B line of FIG. 8A.

FIG. 8A is a plane view of a semiconductor probe of a second embodiment according to the present invention. FIG. 8B is a cross sectional view taken by 8C—8C line of FIG. 8A. The same symbols as said symbols show the same or similar portions. The present embodiment is characterized by that the Schottky junction 50 is actually formed at the whole surface of the arm portion 10a.

That is, in the above-mentioned first embodiment, the area of the Schottky junction is comparatively small as the Schottky junction 50 is formed at only a part of surface of the arm portion 10a. Because of that, while leakage current is little, it is difficult to obtain high sensitivity. However, the second embodiment is characterized by that high sensitivity is obtained though leakage current increases a little comparing with said first embodiment as the Schottky junction 50 is formed at whole surface of the arm portion 10a.

Next, referring FIGS. 9 to 13, other embodiments of the present invention will be described. Said insulation film 40 (thin film 8) for always subjecting the Schottky junction 50 to stress/strain may be formed on at least one of surface or the back in any embodiment though the film is not shown in each figure.

Figure 9:
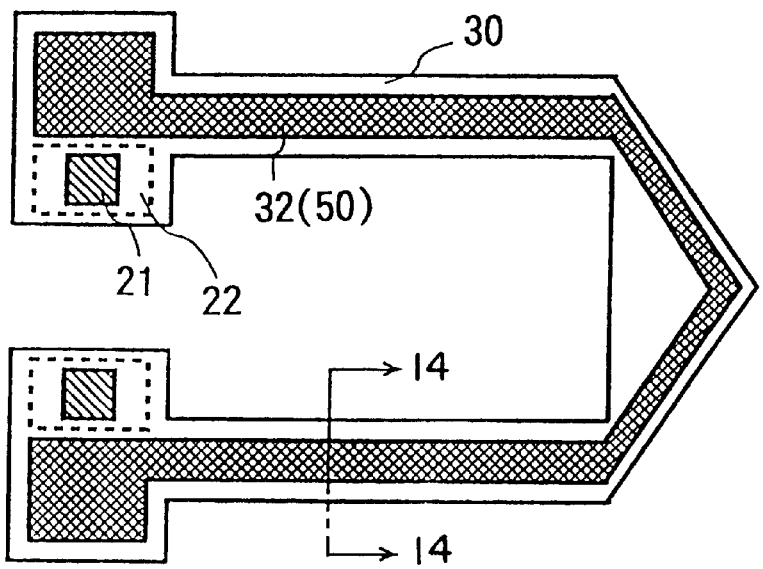
FIG. 9 is a plane view of a third embodiment of the present invention.

FIG. 9 is a plane view of a third embodiment of the present invention. The same symbols as said symbols show the same or similar portion. The embodiment is characterized by that an electrode 32, namely a Schottky junction 50, is generally band-shaped at a center portion of the arm portion 10 so that the Schottky junction is not exposed at an end surface of the arm portion 10a. Although leakage current generally appears near by the end surface of the PN junction, high sensitivity is obtained while depressing leakage current though the manufacturing process becomes complex a little according to the present invention as the Schottky junction 50 is not exposed at end surface of the probe 10.

Figure 10:
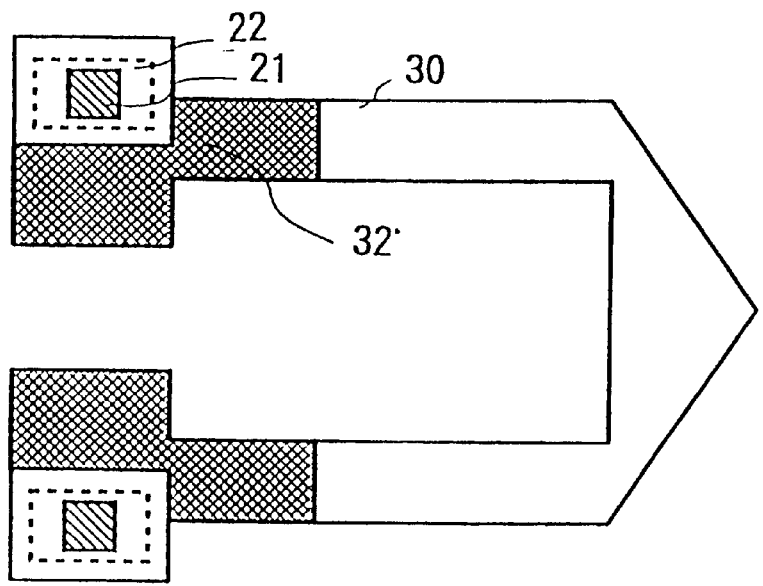
FIG. 10 is a plane view of a fourth embodiment of the present invention.

FIG. 10 is a plane view of a fourth embodiment, of the present invention. The same symbols as said symbols show the same or similar portion. The present embodiment is done from the point of view that a strain caused by displacement applying to the probe 10 concentrates on a border part of the arm portion 10a and the supporting portion 10b, namely a beam portion of the probe 10, and that except at these portions, the strain becomes least.

The present embodiment, as shown in the figure, is characterized by that an electrode 32 (a Schottky junction 50) is formed at only said beam portion. According to the present embodiment, high sensitivity is obtained while depressing leakage current as the Schottky junction is not formed at a part not contributing detection of strain.

Figure 11:
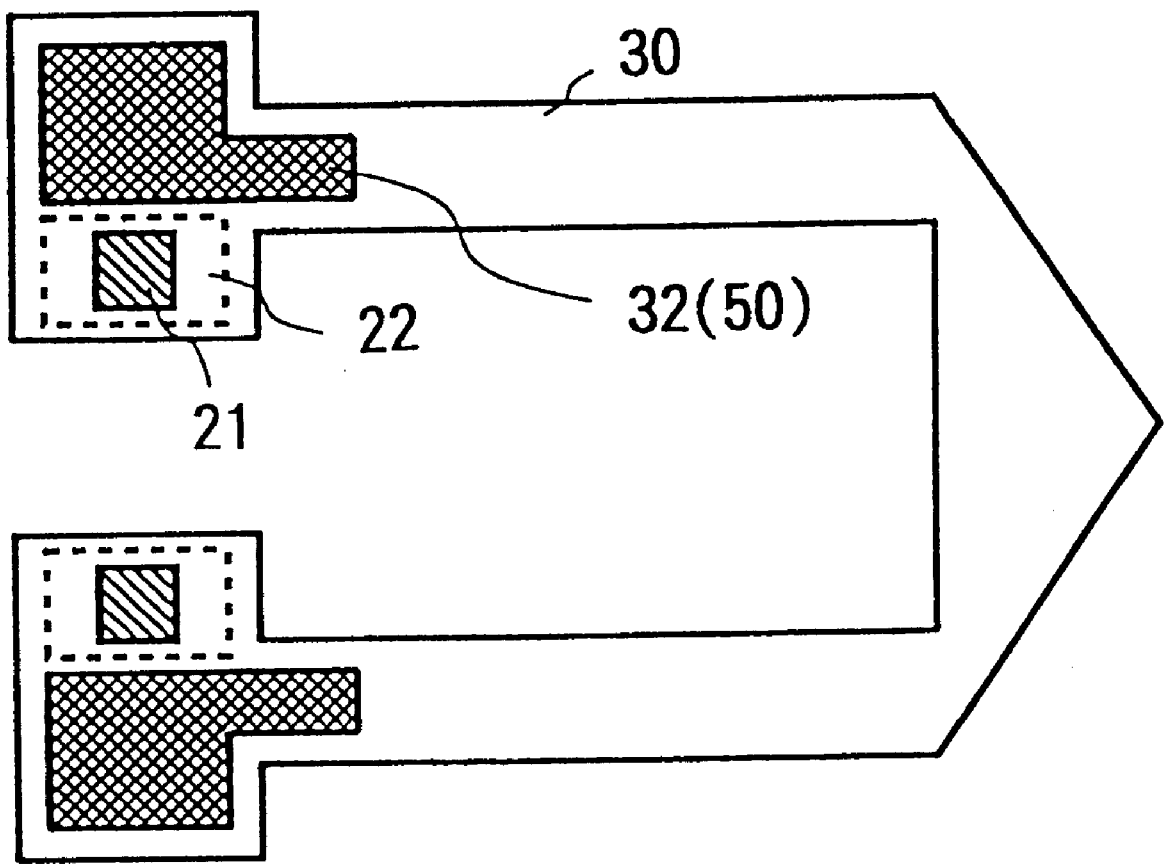
FIG. 11 is a plane view of a fifth embodiment of the present invention.

FIG. 11 is a plane view of a fifth embodiment of the present invention. The same symbols as said symbols show the same or similar portion. The present embodiment is characterized by that an electrode 32 (a Schottky junction 50) is formed at only the beam portion of the probe 10, and is generally band-shaped at a center portion of the probe 10 in order to decrease leakage current, as set fourth above for said fourth embodiment.

Figure 12:
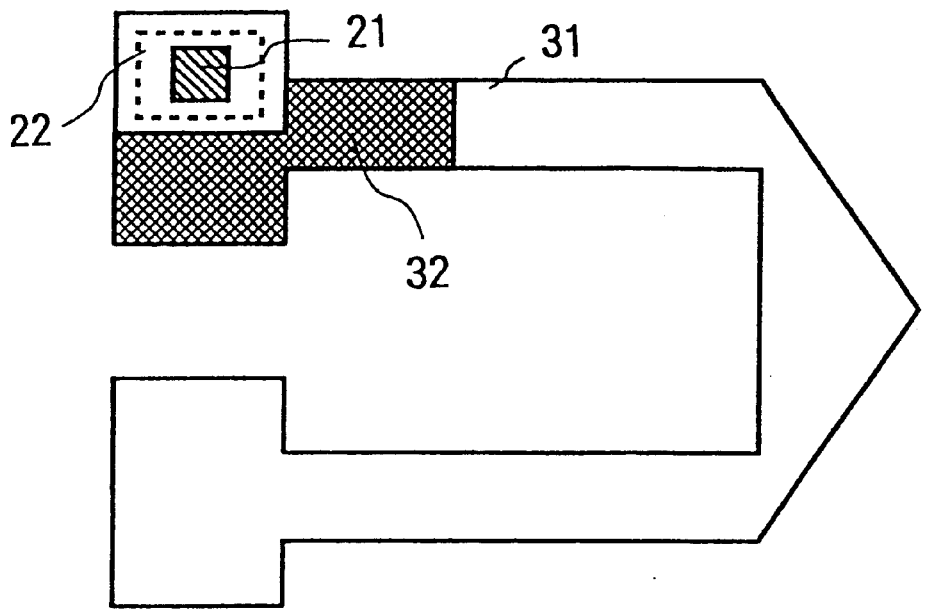
FIG. 12 is a plane view of a sixth embodiment of the present invention.
Figure 13:
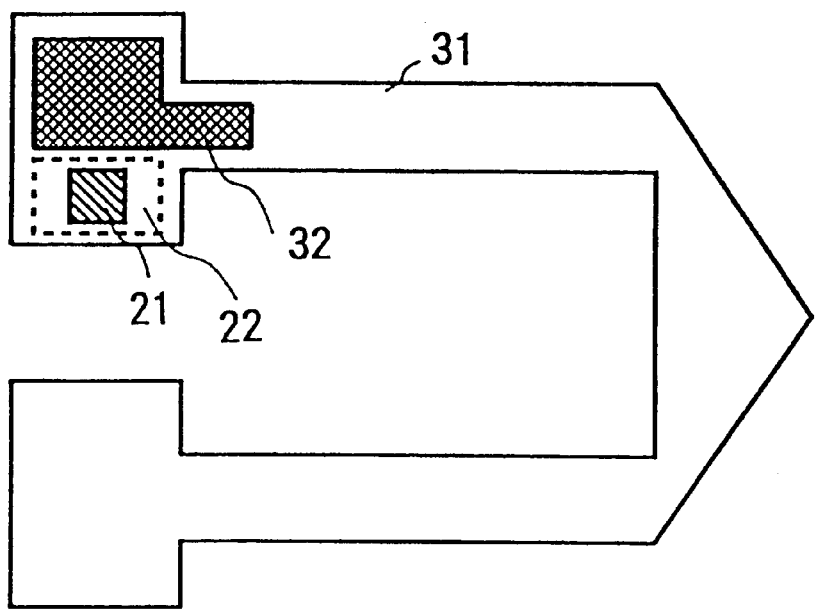
FIG. 13 is a plane view of a seventh embodiment of the present invention.

FIGS. 12 and 13 are plane views of a sixth and a seventh embodiment of the present invention. The same symbols as said symbols show the same or similar portion. Each embodiment is characterized by that respective electrode 32 (the Schottky junction 50) of said fourth and fifth embodiments is formed at only one of said beam portion. According to the embodiment, leakage current sharply decreases though detecting sensitivity decreases a little.

Although it is described that a metal electrode is connected to the N-type substrate 31 to obtain the Schottky junction in each of the above mentioned embodiments, conversely a metal electrode may be contacted to the P-type substrate to obtain the Schottky junction.

Figure 14:
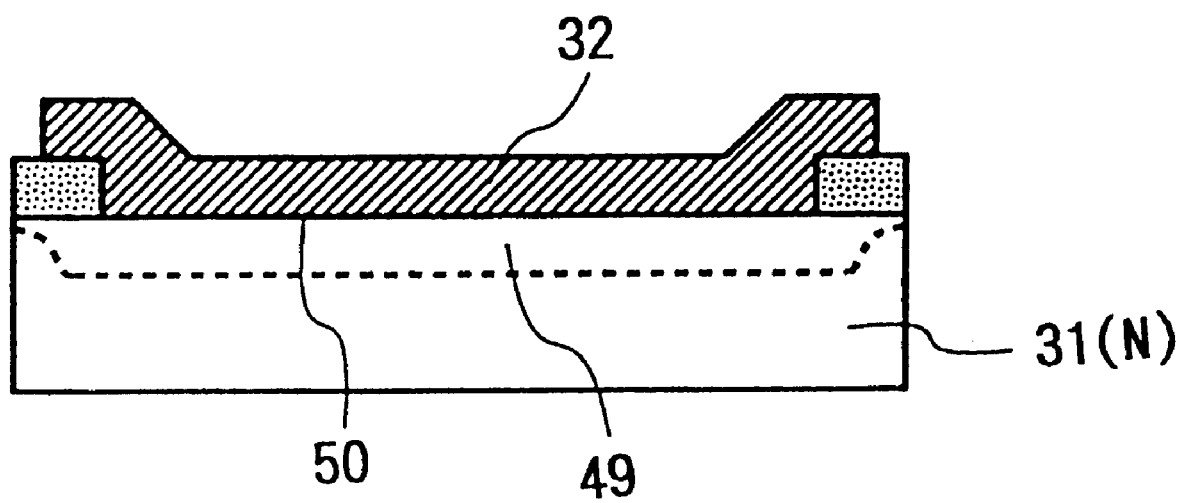
FIG. 14 is a sectional view of a space charge layer appearing at a Schottky junction part taken by 14—14 line of FIG. 9.

In the configuration forming the Schottky junction 50 so as not to expose at an end surface of the probe, such as the embodiments described in FIGS. 9, 11, and 13, leakage current by spreading of space charge layer 49 increases since reverse bias is applied to the Schottky junction 50 as shown in FIG. 14. In usual use, leakage current appears at the end portion of the arm portion 10a. Because of that, a new problem may appears due to a decrease in the measuring sensitivity. Therefore, in each embodiment of the present invention described below, increase of leakage current is depressed.

Figure 15A:
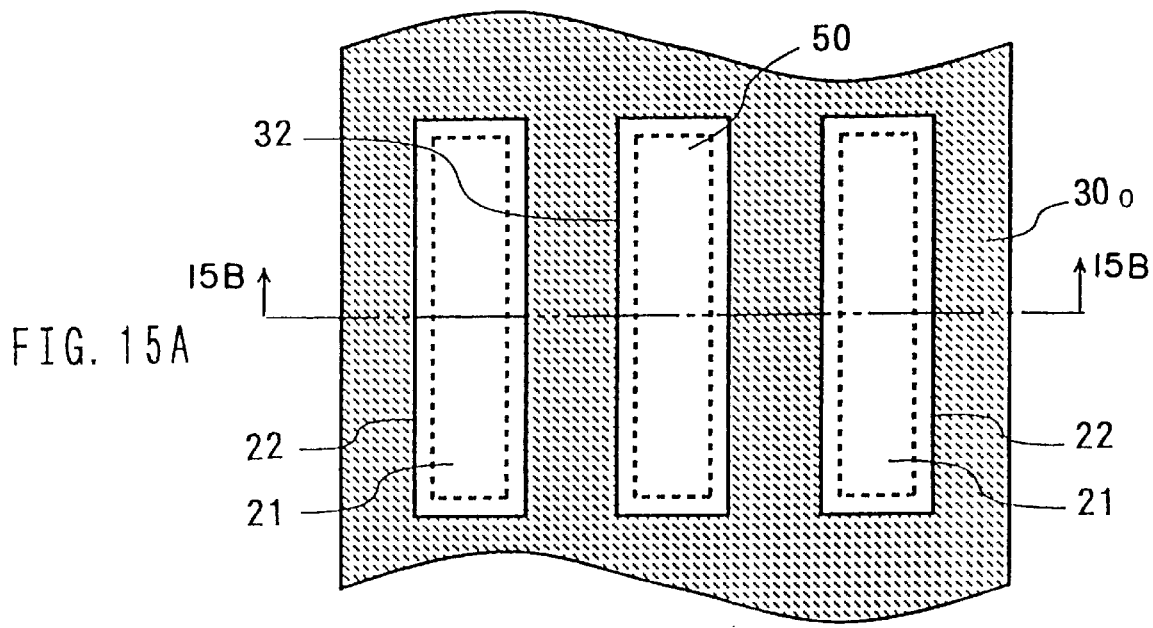
FIG. 15A is a plane view of an eighth embodiment of the present invention.
Figure 15B:
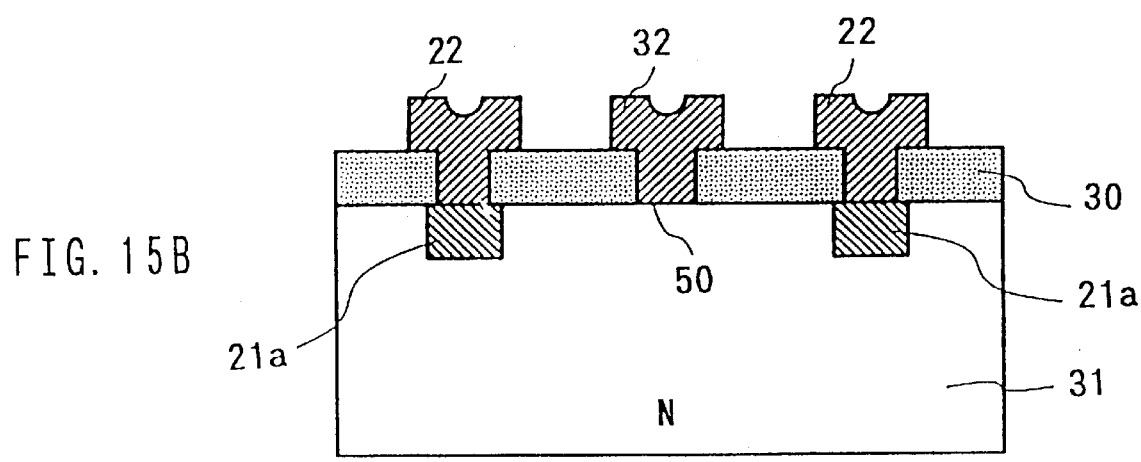
FIGS. 15B and 15C are a sectional views taken by 15—15 line of FIG. 15A.
Figure 15C:
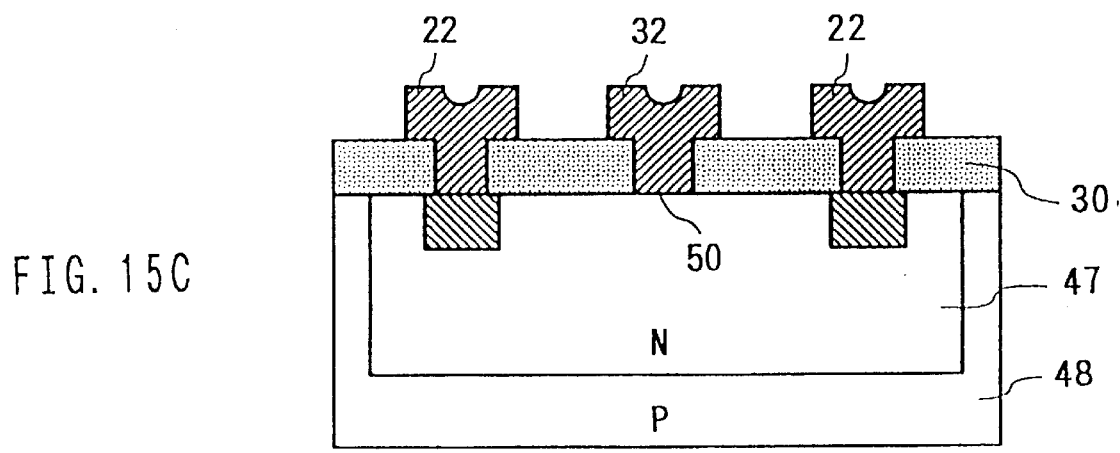

FIG. 15A is a plane view of an eighth embodiment of the present invention. FIGS. 15B and 15C are sectional views taken by 15B—15B line of FIG. 15A. These figures are particularly shown enlarging near beam portion bending corresponding to displacement of the arm portion 10a. In the present embodiment, an electrode 32 is generally band-shaped at a center portion of the beam portion of the probe 10 so that the Schottky junction 50 does not expose at both end surfaces of the probe 10 as shown in FIG. 15A. An $N^+$ contact domain 21a is formed at surface of an N-type substrate 31 exposed between an end portion 10a and the Schottky junction 50 serving as prevention of enlarging space charge layer and so on.

According to the configuration, spread of horizontal direction of the space charge domain 49 or the like appearing at circumference of the Schottky junction is prevented by the $N^+$ contact domain 21a. Therefore, leakage current is depressed so as to prevent decrease of measuring sensitivity.

By forming an N-type semiconductor domain 47 at a main surface of a P-type substrate 48 with an island-shape and by forming the above-mentioned configuration at the N-type semiconductor domain 47, leakage current is more decreased by separation with a PN junction.

Figure 16A:
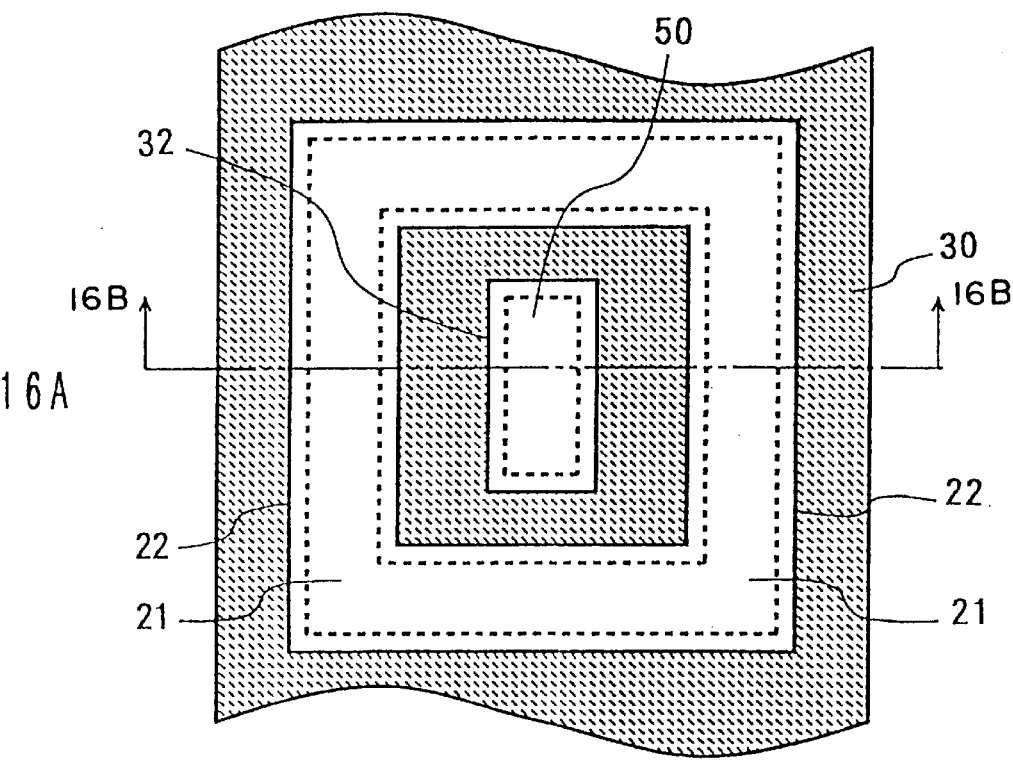
FIG. 16A is a plane view of a ninth embodiment of the present invention.
Figure 16B:
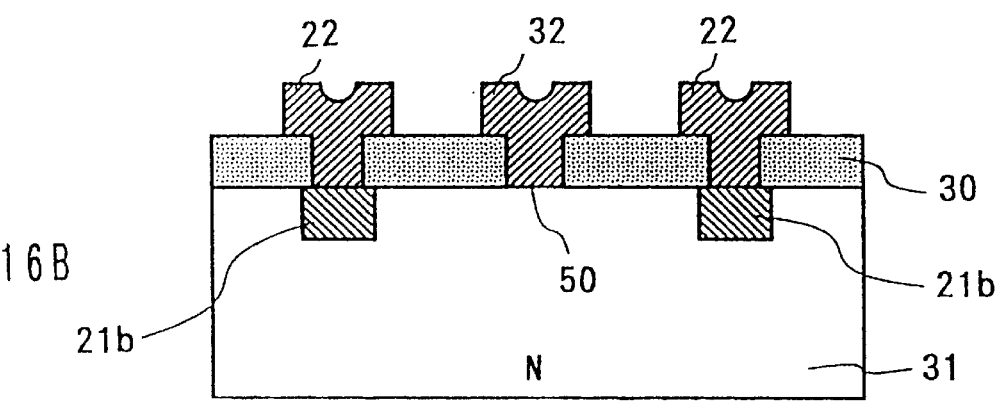
FIGS. 16B and 16C are a sectional views taken by 16B—16B line of FIG. 16A.
Figure 16C:
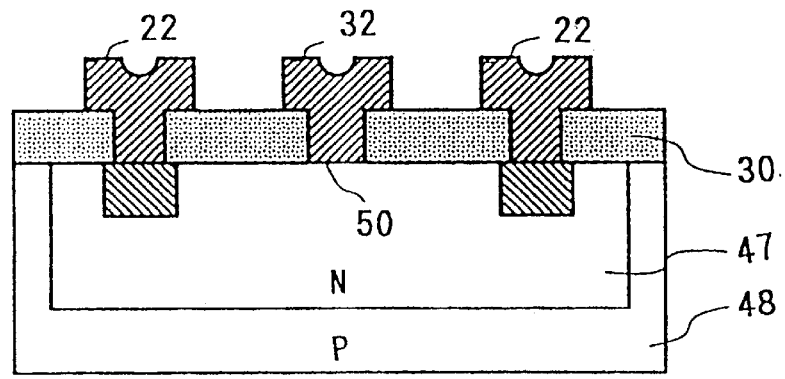

FIG. 16A is a plane view of a ninth embodiment of the present invention. FIGS. 16B and 16C are sectional views taken by 16B—16B line of FIG. 16A. The same symbols as said symbols show the same or similar portion. The present embodiment is characterized by an electrode 32 that has a generally band shape at a center portion of a probe 10 so that the Schottky junction 50 is not exposed at both end surfaces of the probe 10 and an $N^+$ contact domain 21b is formed to surround the Schottky junction 50 as shown in FIG. 16A.

In the present embodiment too, spread of horizontal direction of the space charge layer 49 and so on is prevented by the $N^+$ contact domain 21 so as not to reach the end portion of the arm portion 10a. Therefore, the measuring sensitivity is kept high because an increase of leakage current is depressed. By forming the above-mentioned configuration at an N-type semiconductor domain 47 as shown in FIG. 16C in the present embodiment too, leakage current is more decreased by separation with a PN junction.

Figure 17A:
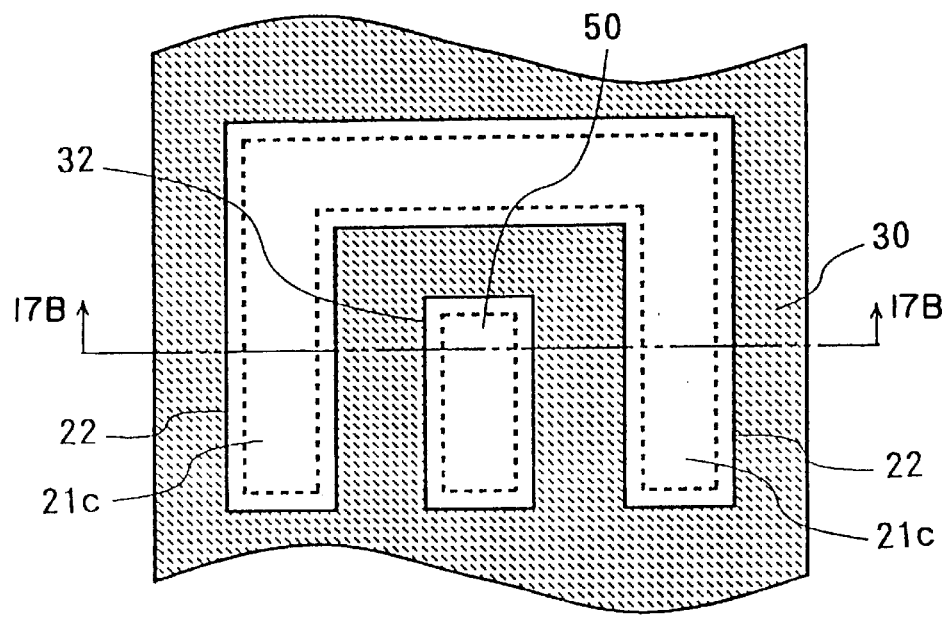
FIG. 17A is a plane view of a tenth embodiment of the present invention.
Figure 17B:
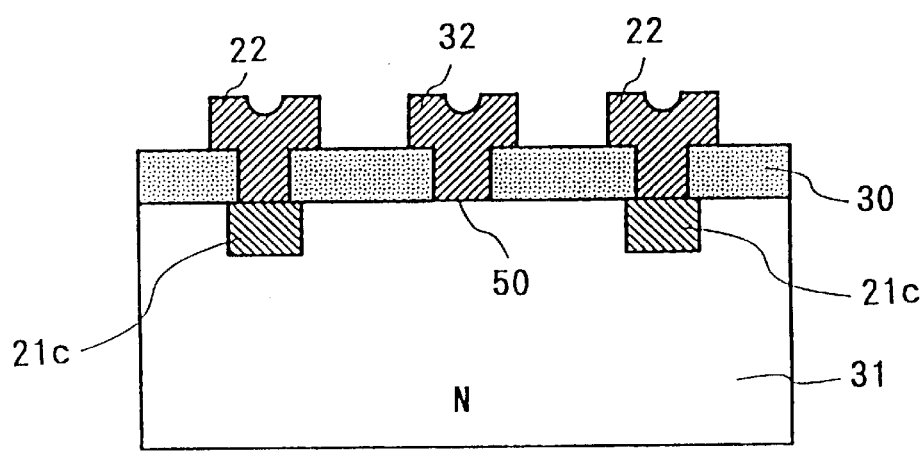
FIGS. 17B and 17C are a sectional views taken by 17B—17B line of FIG. 17A.
Figure 17C:
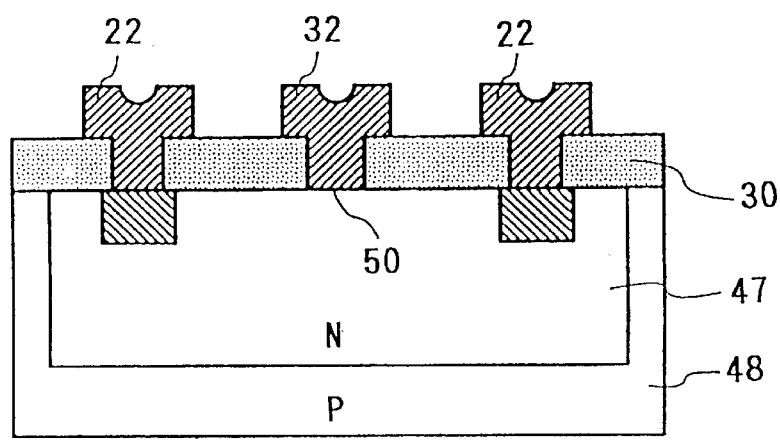

FIG. 17A is a plane view of a ninth embodiment of the present invention. FIGS. 17B and 17C are sectional views taken by 17B—17B line of FIG. 17A. The same symbols as said symbols show the same or similar portion. The present embodiment is characterized by that an electrode 32 is formed at center portion of a probe 10 so that the Schottky junction 50 is not exposed at both end surfaces of the probe 10 and an $N^+$ contact domain 21c is formed to surround the Schottky junction 50 from three directions.

In the present embodiment too, leakage current appearing at a circumference of the Schottky junction 50 is depressed by the $N^+$ contact domain 21c and the leakage current does not reach the end portion of the probe 10. Therefore, a measuring sensitivity is kept high because an increase of leakage current is depressed. By forming the above-mentioned configuration at an N-type semiconductor domain 47 as shown in FIG. 17C in the present embodiment too, leakage current is more decreased by separation with a PN junction.

Figure 18A:
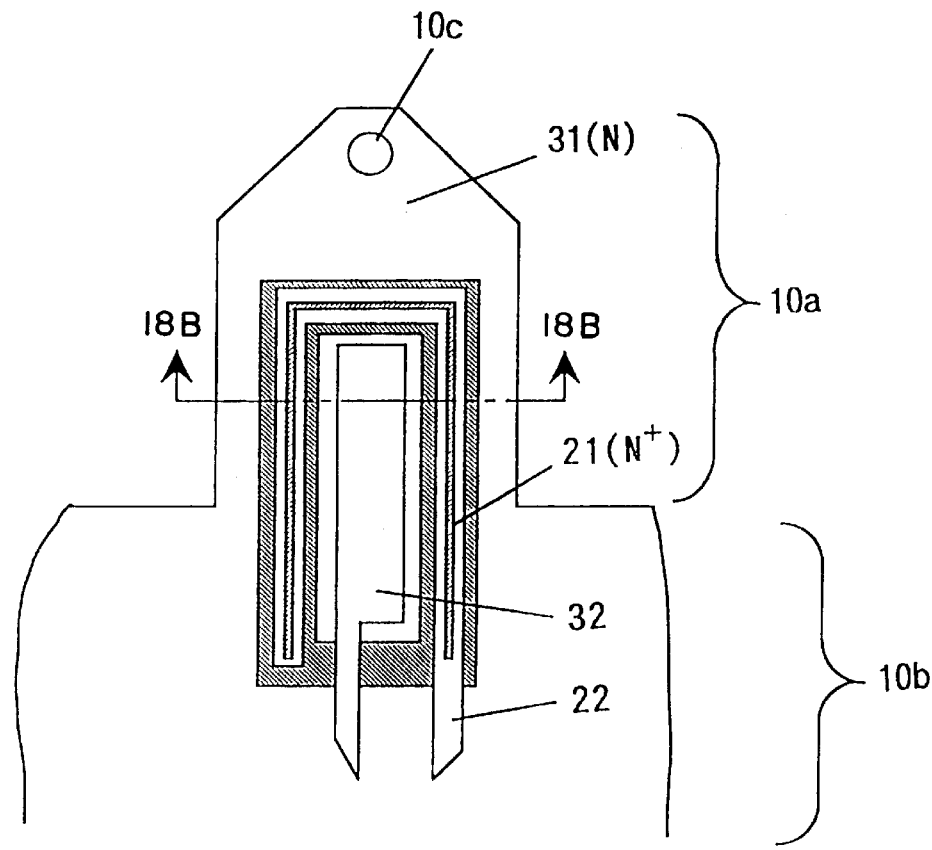
FIG. 18A is a plane view of the eleventh embodiment of the present invention.
Figure 18B:
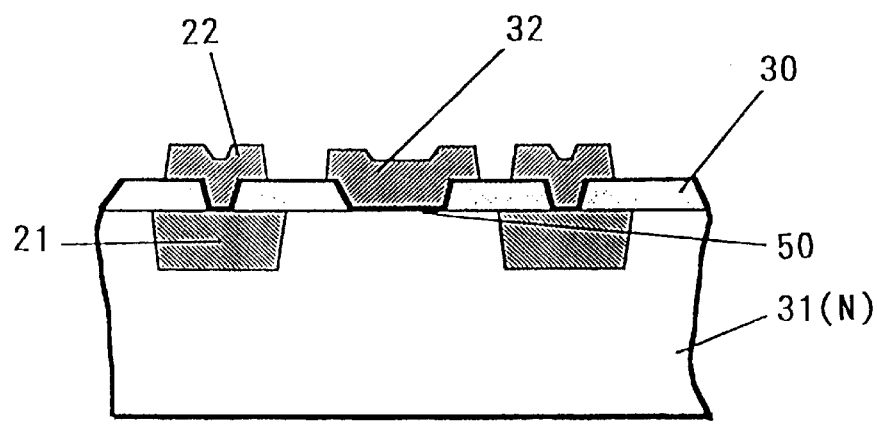
FIG. 18B is a sectional views taken by 18B—18B line of FIG. 18A.

FIGS. 18A and 18B show an example in which the sensor of the ninth embodiment of the present invention (FIG. 16) is actually formed on a rectangular arm portion. FIG. 18A is a plane view of the embodiment. FIG. 18B is a sectional view taken by 18B—18B line of FIG. 18A. The same symbols as said symbols show the same or similar portion. In the eighth to tenth embodiments, a width of the sensor becomes wide as a Schottky junction 50 is formed at a center portion of the sensor portion, and at a circumference portion, an $N^+$ contact domain 21 is formed. Therefore, in order to make a width of the arm portion 10a small, a rectangular arm is easier than a U-shape arm as a design for the arm portion.

Although it is described that a thin film is used for the insulation film 40 in each embodiment, the present invention is not so limited. The thin film for subjecting the Schottky junction to stress/strain may be a conductive film or a semiconductive film so long as the insulation film is previously formed at a surface of substrate without relation to stress/strain and the thin film is formed at the insulation film.

Figure 19:
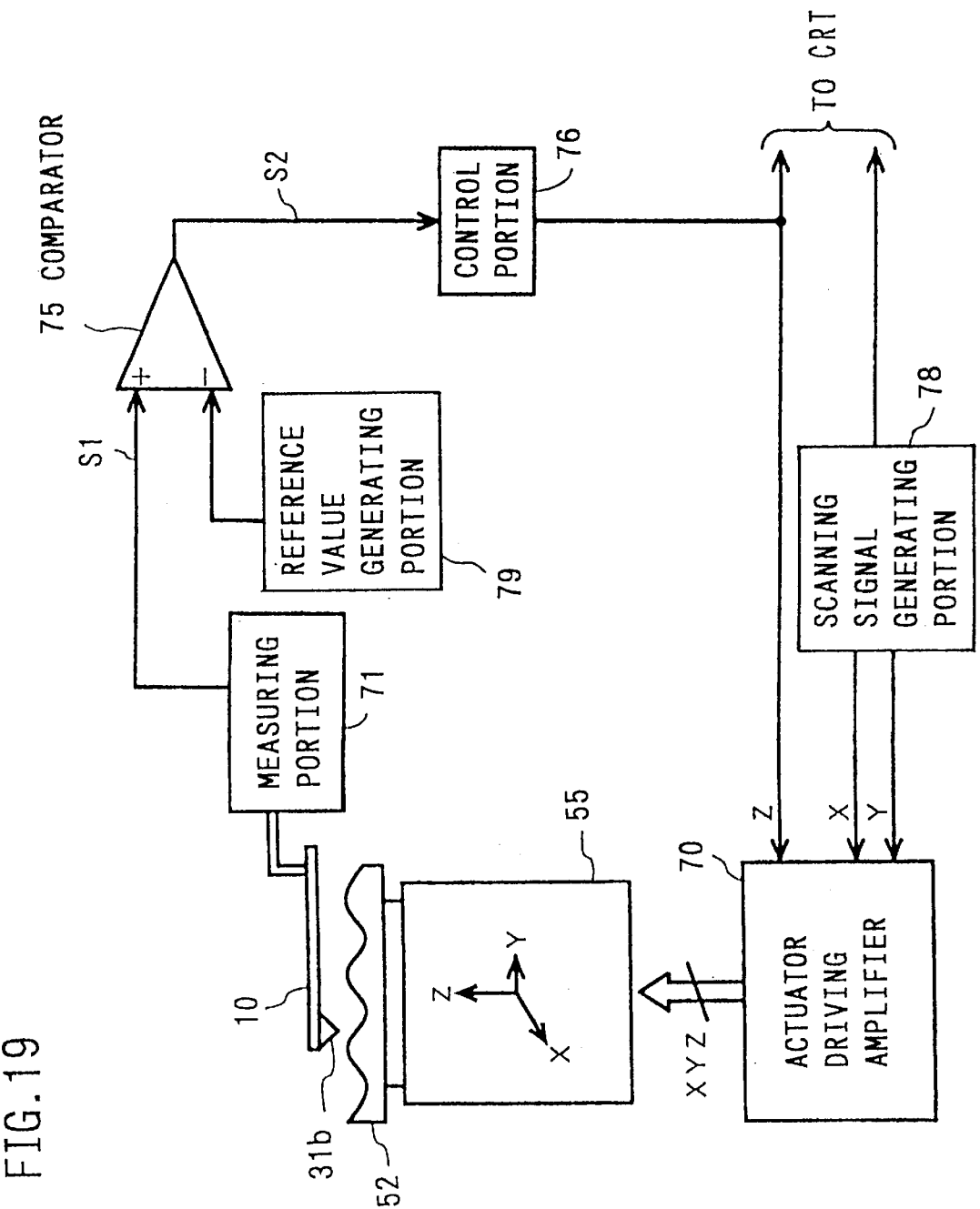
FIG. 19 is a block diagram of main components of a scanning probe microscope according to the present invention.
Figure 20:
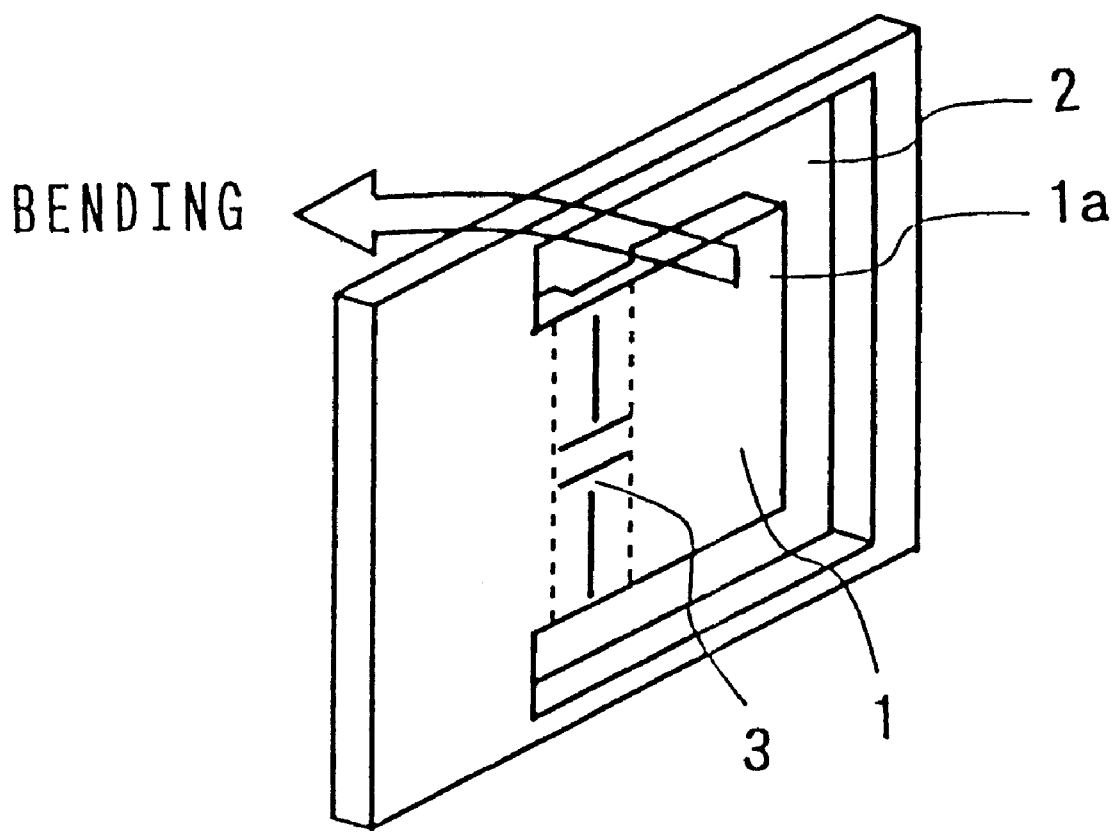
FIG. 20 is a perspective view showing a conventional probe-type semiconductor strain sensor.

FIG. 19 is a block diagram showing a configuration of the scanning probe microscope using the present invention. A sample 52 is set on a three dimensions sample stage 55, and an exploring needle 31c of the probe 10 configured like the above-mentioned is arranged facing the stage. A diode characteristic of a Schottky junction formed at the probe 10 is detected at a measuring portion 71 and inputted to a non-inversion input terminal (+) of a differential amplifier 75 as a bending signal S1.

A reference value relative to bending of the probe 10 is inputted to an inversion input terminal (−) of the differential amplifier 75 so that output of the differential amplifier 75 becomes zero when bending is zero for example. An error signal S2 outputted from the differential amplifier is inputted to a control portion 76. The control portion 76 controls an actuator driving amplifier 70 so that the error signal S2 approaches zero. Output signal of the control portion 76 is supplied to a CRT as a luminance signal. A scanning signal generating portion 78 supplies a differential signal for slightly moving the sample 52 toward XYZ directions to the actuator driving amplifier 70, and a raster scanning signal is supplied to the CRT.

As above-mentioned, the present invention has the following advantages:

(1) As a Schottky junction in which an electric characteristic sensitively changes in response to strain is formed at a probe so as to detect bending of the probe as a change in the electric characteristic of Schottky junction, not only sensitivity to bending of the probe increases, but also a configuration of a detecting circuit connected to the next stage.

(2) As a high concentration contact domain is formed between a Schottky junction and end portion of a probe so that space charge layer and so on appearing at the Schottky junction does not reach the end portion of the probe, measuring sensitivity can be kept high and increase of leakage current is suppressed.

(3) By forming a thin film at main surface of the probe so as to subject to Schottky junction domain to stress/strain when the probe bends always have stress/strain, sensitivity to deflection of the probe can be improved.

(4) By using the semiconductor strain sensor of the present invention as a probe of a scanning probe microscope, a surface shape of the sample detected as a strain value of the probe is regarded as a change of an electric characteristic of the Schottky junction. Therefore, the surface shape of the sample can be observed with high sensitivity.

What is claimed is:

1. A semiconductor strain sensor comprising: a semiconductor cantilever probe having a free end and a surface portion for undergoing deformation due to a displacement of the free end; and a Schottky junction disposed on the surface portion of the semiconductor cantilever probe and positioned to undergo a change in electrical characteristic in response to the deformation of the surface portion.

2. A semiconductor strain sensor as claimed in claim 1; wherein the semiconductor cantilever probe comprises a beam section having the free end and the surface portion; and wherein the Schottky junction comprises a first metal electrode disposed on a region of the surface portion of the beam section.

3. A semiconductor strain sensor as claimed in claim 2; further comprising a high concentration contact domain disposed in the surface portion of the beam section but not in the region of the surface portion on which the first metal electrode is disposed, and a second metal electrode connected to the high concentration contact domain.

4. A semiconductor strain sensor as claimed in claim 3; wherein the second metal electrode is in ohmic-contact with the high concentration contact domain.

5. A semiconductor strain sensor as claimed in claim 3; wherein the first metal electrode comprises a generally U-shaped metal electrode disposed along an end surface portion of the semiconductor cantilever probe.

6. A semiconductor strain sensor as claimed in claim 3; wherein the first metal electrode is disposed on substantially the entire surface portion of the semiconductor cantilever probe.

7. A semiconductor strain sensor as claimed in claim 3; wherein the first metal electrode is disposed at a distance from an end surface portion of the semiconductor cantilever probe.

8. A semiconductor strain sensor as claimed in claim 7; wherein the high concentration contact domain is disposed between the first metal electrode and the end surface portion of the semiconductor cantilever probe.

9. A semiconductor strain sensor as claimed in claim 7; wherein the high concentration contact domain surrounds the first metal electrode.

10. In a scanning probe microscope for observing the surface of a sample, a semiconductor strain sensor comprising: a semiconductor cantilever probe having a free end and a surface portion for undergoing deformation due to a displacement of the free end; and a Schottky junction disposed on the surface portion of the semiconductor cantilever probe and positioned to undergo a change in electrical characteristic in response to the deformation of the surface portion.

11. A scanning probe microscope as claimed in claim 10; further comprising measuring means for measuring the deflection of the free end of the probe in accordance with the change in electrical characteristic of the Schottky junction.

12. A scanning probe microscope as claimed in claim 10; wherein the semiconductor cantilever probe comprises a beam section having the free end and the surface portion; and wherein the Schottky junction comprises a first metal electrode disposed on a region of the surface portion of the beam section.

13. A scanning probe microscope as claimed in claim 12; further comprising a high concentration contact domain disposed in the surface portion of the beam section but not in the region of the surface portion on which the first metal electrode is disposed, and a second metal electrode connected to the high concentration contact domain.

14. A scanning probe microscope as claimed in claim 13; wherein the second metal electrode is in ohmic-contact with the high concentration contact domain.

15. A scanning probe microscope as claimed in claim 13; wherein the first metal electrode comprises a generally U-shaped metal electrode disposed along an end surface portion of the semiconductor cantilever probe.

16. A scanning probe microscope as claimed in claim 13; wherein the first metal electrode is disposed on substantially the entire surface portion of the semiconductor cantilever probe.

17. A scanning probe microscope as claimed in claim 13; wherein the first metal electrode is disposed at a distance from an end surface portion of the semiconductor cantilever probe.

18. A scanning probe microscope as claimed in claim 17; wherein the high concentration contact domain is disposed between the first metal electrode and the end surface portion of the semiconductor cantilever probe.

19. A scanning probe microscope as claimed in claim 17; wherein the high concentration contact domain surrounds the first metal electrode.

20. A semiconductor strain sensor as claimed in claim 3; wherein the first metal electrode comprises a generally band-shaped metal electrode disposed along an end surface portion of the semiconductor cantilever probe.

21. A semiconductor strain sensor as claimed in claim 7; wherein the cantilever probe comprises a semiconductor substrate having the surface portion; and further comprising a conductive type semiconductor domain having a generally island shape, the first metal electrode being Schottky-joined to the conductive type semiconductor domain.

22. A semiconductor strain sensor comprising: a cantilever having a fixed end portion and an arm portion extending from the fixed end portion, the arm portion having a free end for undergoing flexural displacement; and a Schottky junction disposed on the arm portion of the cantilever; wherein when the free end of the arm portion of the cantilever is subjected to flexural displacement, the amount of displacement of the free end is detected on the basis of a change in an electrical characteristic of the Schottky junction.

23. A semiconductor strain sensor according to claim 22; wherein the cantilever has a main surface extending between the fixed end portion and the free end of the arm portion of the cantilever and defining inner and outer boundary regions of the cantilever; and wherein the Schottky junction is disposed on the main surface of the cantilever between and not including the inner and outer boundary regions of the cantilever.

24. A semiconductor strain sensor according to claim 22; wherein the cantilever has a main surface extending between the fixed end portion and the free end of the arm portion of the cantilever and defining inner and outer boundary regions of the cantilever; and wherein the Schottky junction is disposed on the inner boundary region of the cantilever.

25. A semiconductor strain sensor according to claim 22; wherein the cantilever has a main surface extending between the fixed end portion and the free end of the arm portion of the cantilever; and wherein the Schottky junction is disposed on substantially the entire main surface of the cantilever.

26. A semiconductor strain sensor according to claim 22; wherein the fixed end portion of the cantilever has a pair of spaced-apart support portions; and wherein the arm portion of the cantilever comprises a pair of spaced-apart arms each connected to one of the spaced-apart support portions, the Schottky junction being disposed only on a surface portion of one of the support portions and on a surface portion of the arm connected to said one support portion.

27. A scanning probe microscope having a scanning probe comprising the semiconductor strain sensor as set forth in claim 22.

* * * * *